United States Patent [19]

Eberle

[11] Patent Number: 4,573,413
[45] Date of Patent: Mar. 4, 1986

[54] MONORAIL TRANSPORT SYSTEM
[75] Inventor: Jürg Eberle, Hinwil, Switzerland
[73] Assignee: Feramatic AG, Hinwil, Switzerland
[21] Appl. No.: 495,773
[22] Filed: May 18, 1983
[30] Foreign Application Priority Data May 25, 1982 [CH] Switzerland .................. 3202/82

[51] Int. Cl.⁴ ............................................. B61B 13/06
[52] U.S. Cl. .................. 104/120; 104/172 R; 104/247; 105/145
[58] Field of Search ............. 104/108, 118, 119, 120, 104/140, 165, 172 R, 247; 105/141, 144, 145

[56] References Cited

U.S. PATENT DOCUMENTS

| | | | |
|---|---|---|---|
| 1,730,519 | 10/1929 | McKee | 104/95 |
| 2,645,185 | 7/1953 | Fields | 104/120 X |
| 2,844,243 | 7/1958 | Christiansen et al. | 104/140 X |
| 3,092,039 | 6/1963 | Lich | 104/119 X |
| 3,610,162 | 10/1971 | Lawrence | 104/118 |
| 4,201,137 | 5/1980 | Lagsdin | 104/119 X |

FOREIGN PATENT DOCUMENTS

| | | | |
|---|---|---|---|
| 549695 | 1/1957 | Belgium | 104/120 |
| 706293 | 3/1965 | Canada | 104/120 |

Primary Examiner—Randolph A. Reese
Attorney, Agent, or Firm—Werner W. Kleeman

[57] ABSTRACT

The transport system comprises a rail and an undercarriage provided with two running wheels arranged in the longitudinal axis of the undercarriage. The running wheels have curved travel or bearing surfaces which rest upon a complementary curved supporting surface of the rail. The undercarriage is guided by a pair of guiding rollers arranged below the rail supporting surface, these guiding rollers engaging a guiding web extending perpendicularly between the guiding rollers. During travelling along curves the undercarriage is inclined towards the interior or inner side, whereby the occurring centrifugal forces are compensated.

6 Claims, 4 Drawing Figures

MONORAIL TRANSPORT SYSTEM

BACKGROUND OF THE INVENTION

The present invention relates broadly to a new and improved transport system or installation, and, more specifically to a new and improved transport system which is of the type comprising a rail and an undercarriage or carriage —herein simply broadly undercarriage—which travels upon the rail.

When travelling through curved paths centrifugal forces arise which act upon the vehicle and upon the material transported thereby. In the case of piece goods such forces can be compensated by providing therefor appropriate attachment or securing means. In the case of bulk materials or liquids only the container may be attached or secured, however, not the handled material itself. The containers for such goods, therefore, still have to be additionally tightly closed. The necessity for securing or, respectively, providing a tight closure which is even required for shorter transport or travel distances like, for example, within a room or a fabrication plant, increases the temporal and material expense which, in turn, has a disadvantageous effect upon the economies of the transport operation.

The aforementioned centrifugal forces may be compensated for by appropriately inclining the vehicle. Such inclination may be achieved in the case of double-rail vehicles by elevating one rail above the other and in the case of roads by banking the driving or road surface at the outer side of the curve.

SUMMARY OF THE INVENTION

Therefore, with the foregoing in mind it is a primary object of the present invention to provide a new and improved transport system having two-dimensional travel paths, i.e. moving through curves, wherein the undercarriage may be inclined towards the inner side of the curve without undertaking any specific structural design of the corresponding section of the travel path.

Now in order to implement this and still further objects of the invention, which will become more readily apparent as the description proceeds, the transport system or installation of the present development is manifested by the features that, the undercarriage rests with two running or travel wheels having a curved travel or bearing surface and arranged in a longitudinal axis thereof upon a supporting surface of the rail which is curved complementary with respect to the travel or bearing surfaces. This undercarriage is guided by a pair of guiding or guide rollers arranged between the running wheels and extending below the supporting surface at a substantially perpendicularly extending guide or guiding web of the rail which extends intermediate the guiding rollers. The undercarriage is driven by any suitable drive means.

The specific relative arrangement of the pair of guiding or guide rollers and the running or travel wheels which are rigidly interconnected by means of the undercarriage and the connection lines of which form a triangle as well as the design of the travel or bearing surfaces at the travel or running wheels and the supporting surface at the rail cause the undercarriage to become inclined towards the inner side of the momentarily passed curve.

Upon passing through a curve the line interconnecting the travel or running wheels corresponds to a chord, i.e. to a straight line extending within the curve. At the same time the pair of guide or guiding rollers arranged intermediate the running wheels follows the guide or guiding web of the rail, i.e. follows along a line lying outside of the chord. Consequently, the running wheels will be urged inwardly and the triangle, the corners of which are defined by the running wheels and by the pair of guiding rollers, will be inclined towards the inner side of the curve. During this passage the running wheels with their travel or bearing surfaces not only describe curved lines along a two-dimensional path corresponding to the curve but a curved line extending in three dimensions. The lateral movement of the running wheels is permitted by virtue of the complementary curved surfaces of the rail and the running wheels which bear upon each other, the supporting surfaces exerting a guiding function in addition to the support function. Since the position of the undercarriage is defined by the triangle formed by the running wheels and the pair of guide or guiding rollers a change in the inclination angle of the triangle also corresponds to a change in the inclination of the undercarriage. The largest permissible angle of inclination of the undercarriage is governed by the position of the pair of guiding rollers, i.e. by the distance thereof to the line interconnecting the running wheels. When this distance is decreased the undercarriage may become more intensively inclined when travelling through a curve.

The inclination of the undercarriage or the like in a curve can be compared to the behavior of a motorcycle driver who leans towards the inner side of the curve in order to compensate for the centrifugal forces occurring in the curve.

By inclining the undercarriage of the transport system according to the invention the centrifugal forces acting upon the transported or conveyed material are compensated in a manner analogous to that arising with the driver of a motorcycle. Such compensation enables the transport of loose materials and non-fixed open containers without shifting of piece goods or spilling-over of the container contents when travelling through a curve-shaped transport path.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
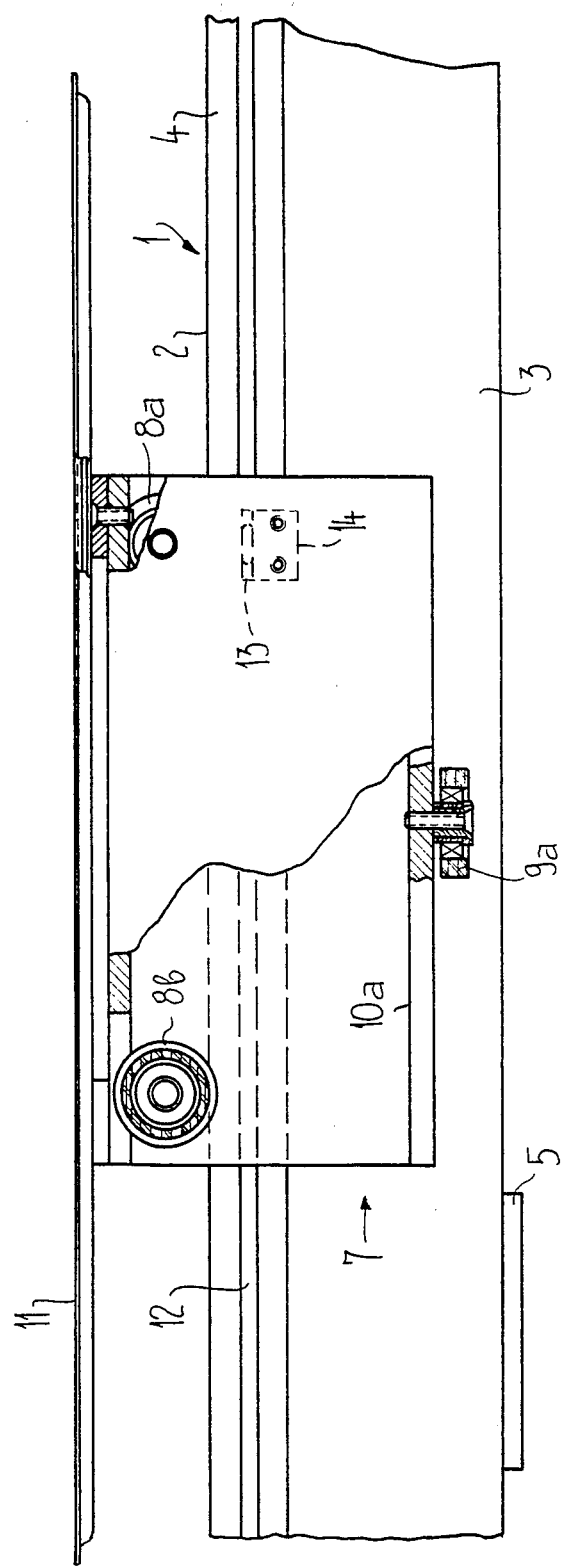
FIG. 1 is a side view, partially in section, of a transport system or installation constructed according to the present invention.
Figure 3:
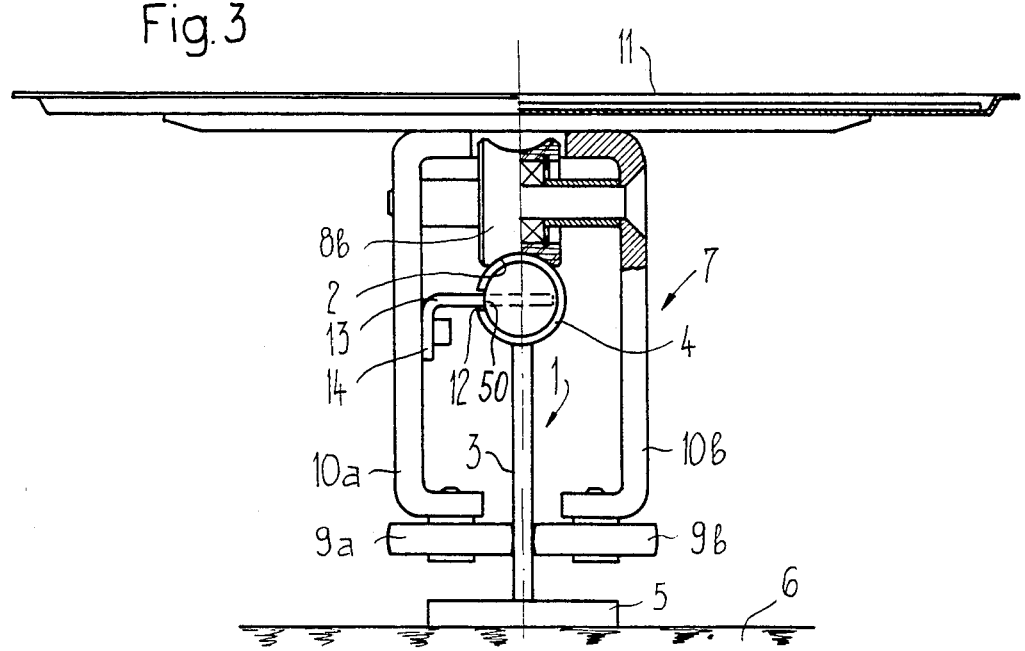
FIG. 3 is a sectional view through the transport system shown in FIG. 2 taken substantially along the line III—III thereof, the undercarriage and running wheels of which are shown partially in section.
Figure 4:
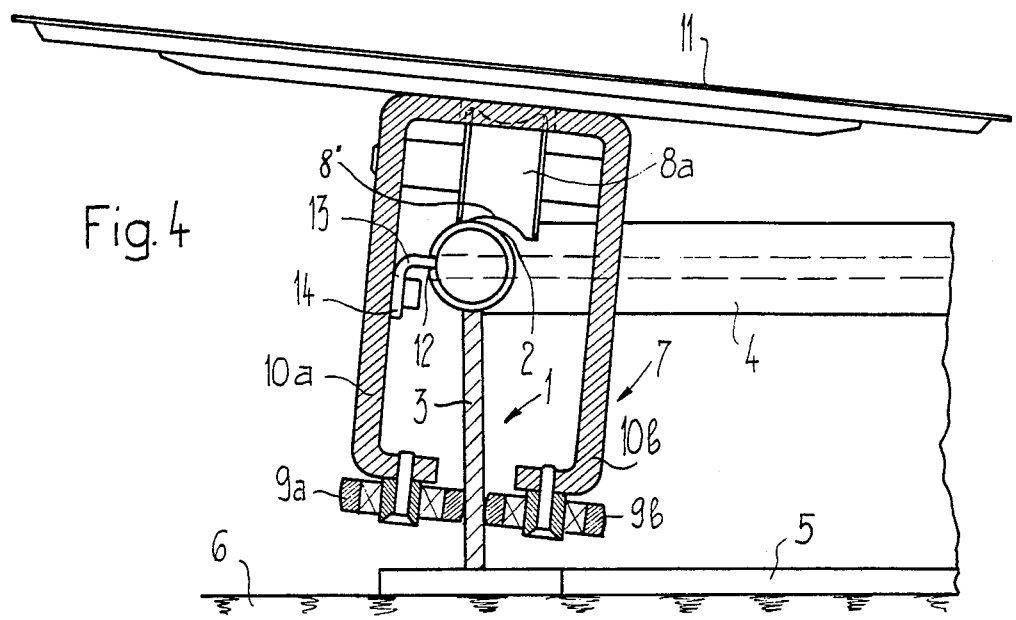
FIG. 4 is a sectional view through the transport system shown in FIG. 2 taken substantially along the line IV—IV thereof.

Describing now the drawings, it is to be understood that only enough of the construction of the inventive transport system or installation has been shown as needed for those skilled in the art to readily understand the underlying principles and concepts of the present development, while simplifying the showing of the drawings. Turning attention now specifically to FIG. 1, there has been illustrated therein an exemplary embodiment of transport system or installation containing a guiding or guide rail 1 possessing a supporting or support surface 2 and a perpendicular guiding or guide web 3 arranged beneath the supporting surface 2. The supporting surface 2 is formed, as shown in FIGS. 3 and 4, by a substantially tubular or tube-shaped hollow rail or rail member 4. Such supporting surface 2 is substantially convex and possesses a substantially circular-cylindrical configuration. The guide rail or rail structure 1 bears by means of support or bracing elements 5 extending normally with respect to the guiding or guide web 3, upon a base or supporting surface 6 which, for example, may be constituted by a floor at which the rail structure 1 may be secured.

An undercarriage or carriage arrangement 7 or equivalent structure rests with two travel or running wheels 8a, 8b which are provided with concave travel or bearing surfaces 8' upon the supporting surface 2 of the rail structure 1. This undercarriage 7 is also guided by a pair of guiding or guide rollers 9a, 9b arranged between the travel or running wheels 8a, 8b and located to both sides of the guiding web 3 at brackets or cantilevers 10a, 10b extending below the hollow rail member 4. A support or bearing pallet 11 for receiving the transported material or goods is secured to the top of the undercarriage 7.

The hollow rail or rail member 4 possesses a lateral gap or slot 12 into which engages an entrainment or follower member 13 which is connected to any suitable and therefore not here particularly further illustrated drive means, merely generally indicated in FIG. 3 by reference character 50 which, for example, may comprise a universal or ball-and-socket type link chain. The downwardly bent end 14 of the entrainment member 13 is connected to the bracket 10a.

Figure 2:
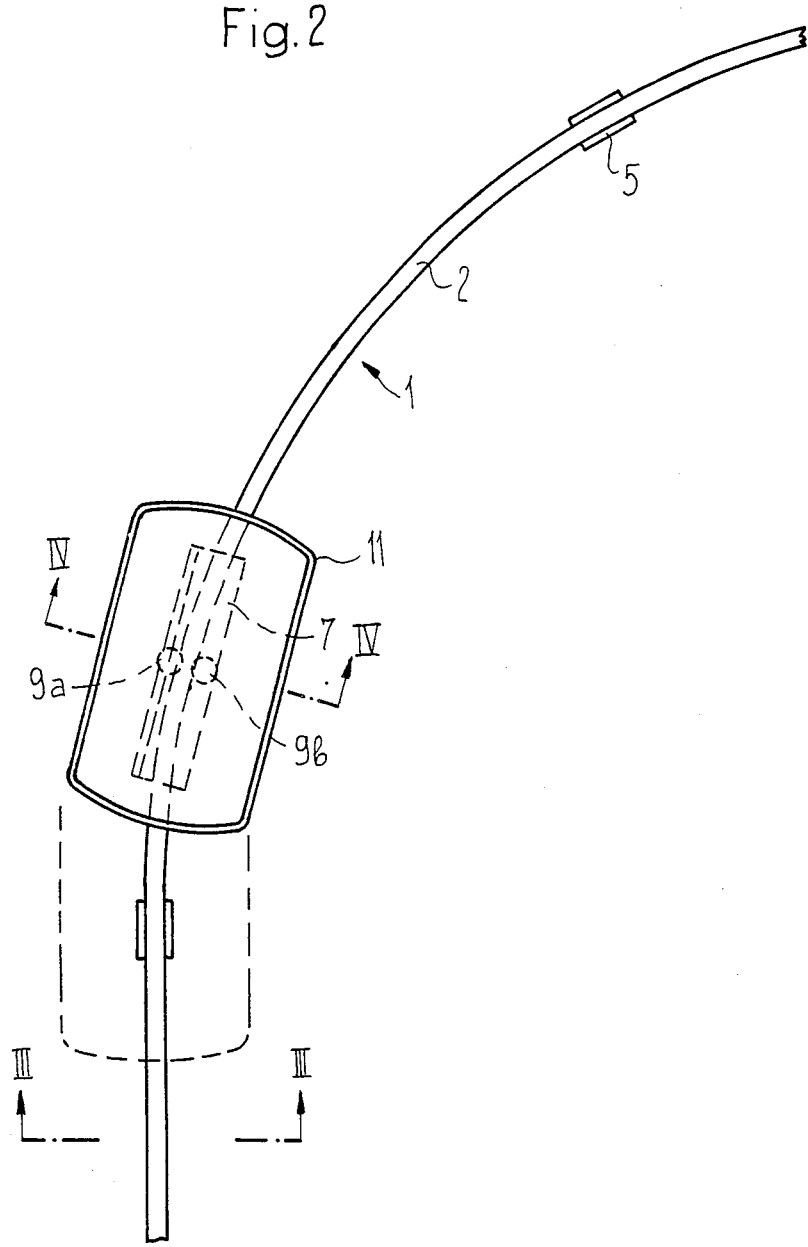
FIG. 2 is a top plan view of the transport system shown in FIG. 1.

Upon passing through a curve, as best seen by referring to FIGS. 2 and 4, the pair of guiding or guide rollers 9a, 9b are guided along the guiding or guide web 3, i.e. outside of the straight line interconnecting the travel or running wheels 8a, 8b. As a result, the triangle defined by the running wheels 8a, 8b and the pair of guiding rollers 9a, 9b thus assumes a position which is inclined in comparison to the position assumed during straight ahead travel. The inclined position of the triangle corresponds to an equally inclined position of the undercarriage 7 or the like.

As already explained, the undercarriage 7 can be driven by known drive means. Preferably, as mentioned, an endless universal link chain 50 is used as the drive and which is guided in the hollow rail 4 and is connected to the undercarriage 7, here for instance by means of the entrainment or follower member 13. Such a drive chain 50 can readily follow the curves of the rail structure 1 without any problem.

The guiding or guide web 3 may be either uninterruptedly connected or, if desired, only at predetermined locations with the supporting surface 2 of the guide rail structure 1.

Instead of providing the support or bearing pallet 11, which also may be arranged and fixed to the undercarriage 7 at a different location, there may be provided a load container or receptacle or the like.

The play required between the guiding or guide web 3 and the guiding or guide rollers 9a, 9b required during inclination of the undercarriage 7 may be obtained, for example, by convexly curved or elastic contact or bearing surfaces on the rollers, by resiliently mounting such rollers or by providing flexible guiding ledges.

While there are shown and described present preferred embodiments of the invention, it is to be distinctly understood that the invention is not limited thereto, but may be otherwise variously embodied and practiced within the scope of the following claims. ACCORDINGLY,

What I claim is:

1. A transport system comprising:
   rail means including curved portions and containing a supporting surface;
   at least one drivable undercarriage provided with two running wheels arranged substantially along a lonitudinal axis of said undercarriage;
   a pair of guiding rollers provided for said undercarriage and arranged in a central region of and intermediate said running wheels;
   said pair of running wheels and said pair of guiding rollers being rigidly interconnected by means of said undercarriage in order to permit said drivable undercarriage to assume an inclinded position during travel through said curved portions of the rail means;
   each of said running wheels having a curved bearing surface;
   said supporting surface of said rail means being curved substantially complementary to said curved bearing surfaces of said running wheels and coacting therewith;
   a guiding web cooperating with said rail means and extending between said pair of guiding rollers beneath said supporting surface of said rail means;
   each one of said guiding rollers and said pair of running wheels are rigidly arranged in a predetermined substantially triangular configuration;
   a support for receiving material to be transported;
   said support being secured to said undercarriage;
   each one of said guiding rollers being arranged sufficiently close to said pair of running wheels in said predetermined substantially triangular configuration to ensure for an adequately inclined position of said drivable undercarriage during travel through said curved portions of the rail means so that any material received and transported on said support is not moved away from said support during travel of said drivable undercarriage through said curved portions of the rail means.

2. The tranpsort system as defined in claim 1, further including:
   drive means for driving said at least one undercarriage.

3. The transport system as defined in claim 1, wherein:
   said bearing surfaces of said running wheels are substantially concave and said supporting surface of said rail means is substantially convex and possesses a substantially circular-cylindrical configuration.

4. The transport system as defined in claim 3, wherein:
   said rail means comprises a substantially tube-shaped hollow rail member.

5. The transport system as defined in claim 4, wherein:
   said drive means comprise a universal link chain guided in said tube-shaped hollow rail member.

6. The transport system as defined in claim 5, further including:
- brackets provided for said undercarriage and extending below said supporting surface of the rail means;
- said guiding rollers being arranged at said brackets;
- said rail means being provided with slot means;
- an entrainment member connected to one of said brackets; and
- said entrainment member extending through said slot means and being connected to said universal link chain.

* * * * *